(12) United States Patent
Gupta et al.

(10) Patent No.: US 8,983,127 B2
(45) Date of Patent: Mar. 17, 2015

(54) OBJECT TRACKING WITH OPPOSING IMAGE CAPTURE DEVICES

(75) Inventors: Prince Gupta, San Diego, CA (US); Niels da Vitoria Lobo, Maitland, FL (US); Joseph J. LaViola, Jr., Oviedo, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 113 days.

(21) Appl. No.: 13/634,990

(22) PCT Filed: May 13, 2010

(86) PCT No.: PCT/US2010/034706
§ 371 (c)(1),
(2), (4) Date: Nov. 27, 2012

(87) PCT Pub. No.: WO2011/115635
PCT Pub. Date: Sep. 22, 2011

(65) Prior Publication Data
US 2013/0202153 A1 Aug. 8, 2013

Related U.S. Application Data

(60) Provisional application No. 61/315,543, filed on Mar. 19, 2010.

(51) Int. Cl.
G06K 9/00 (2006.01)
G06T 7/20 (2006.01)
H04N 5/225 (2006.01)

(52) U.S. Cl.
CPC ............ *G06T 7/2086* (2013.01); *G06T 7/2066* (2013.01)
USPC .......................................... 382/103; 348/169

(58) Field of Classification Search
CPC .................................... G06K 9/00; G06T 7/00
USPC .......... 382/103, 107, 236; 348/152, 154, 155, 348/169, 170, 171, 172, 352
See application file for complete search history.

(56) References Cited

U.S. PATENT DOCUMENTS

| | | | |
|---|---|---|---|
| 6,917,702 B2* | 7/2005 | Beardsley | 382/154 |
| 2005/0185053 A1 | 8/2005 | Berkey | |
| 2006/0133688 A1* | 6/2006 | Kang et al. | 382/254 |
| 2008/0137913 A1* | 6/2008 | Hildreth | 382/107 |
| 2009/0225300 A1 | 9/2009 | Barrows | |
| 2010/0027844 A1 | 2/2010 | Akita | |
| 2010/0295940 A1* | 11/2010 | Schwarte | 348/135 |

OTHER PUBLICATIONS

International Search Report and Written Opinion mailed Jul. 8, 2010.

(Continued)

*Primary Examiner* — Abolfazl Tabatabai
(74) *Attorney, Agent, or Firm* — Thomas|Horstemeyer, LLC

(57) ABSTRACT

Systems and method of compensating for tracking motion of an object are disclosed. One such method includes receiving a series of images captured by each of a plurality of image capture devices. The image capture devices are arranged in an orthogonal configuration of two opposing pairs. The method further includes computing a series of positions of the object and orientations of the object, by processing the images captured by each of the plurality of image capture devices.

20 Claims, 7 Drawing Sheets

(56) References Cited

OTHER PUBLICATIONS

A. J. Davison, I. D. Reid, N. D. Molton, and O. Stasse. Monoslam: "Real-time single camera slam. IEEE Transactions on Pattern Analysis and Machine Intelligence," 29(6):1052-1067, 2007.

M. Kaess and F. Dellaert. "Visual slam with a multi-camera rig". Technical Report GIT-GVU-06-06, Georgia Institute of Technology, Feb. 2006.

H. Li, R. Hartley, and J.-H. Kim. "A linear approach to motion estimation using generalized camera models". In Computer Vision and Pattern Recognition, pp. 1-8, 2008.

S. Tariq and F. Dellaert. "A multi-camera 6-dof pose tracker". In Proceedings of the 3rd IEEE/ACM International Symposium on Mixed and Augmented Reality, pp. 296-297, Washington, DC, USA, 2004.

A.-T. Tsao, C.-S. Fuh, Y.-P. Hung, and Y.-S. Chen. Ego-motion estimation using optical flow fields observed from multiple cameras. In Computer Vision and Pattern Recognition, p. 457, Washington, DC, USA, 1997. IEEE Computer Society. IEEE Computer Society.

G. Welch, G. Bishop, L. Vicci, S. Brumback, K. Keller, and D. Colucci. High-performance wide-area optical tracking: The hiball tracking system. Presence: Teleoperators and Virtual Environments, 10(1):1-21, 2001.

A. R. Bruss and B. K. P. Horn. Passive navigation. Computer Vision, Graphics, and Image Processing, 21(1):3-20, 1983.

L. Chen, M. T. Ozsu, and V. Oria. Robust and fast similarity search for moving object trajectories. In in Proceedings of ACM SIGMOD International Conference on Management of Data, pp. 491-502, ACM, 2005.

B. Clipp, J.-H. Kim, J.-M. Frahm, M. Pollefeys, and R. Hartley. Robust 6-dof motion estimation for non-overlapping, multi-camera systems. Applications of Computer Vision, IEEE Workshop on, 0:1-8, 2008.

G. Demming. Sony EyetoyTM: Developing mental models for 3-D interaction in a 2-D gaming environment. In Computer Human Interaction, vol. 3101, pp. 575-582. Springer, 2004.

H.C. Longuet-Higgins and K. Prazdny. The interpretation of a moving retinal image. In Proc. Royal Society London. B208, pp. 385-397, 1980.

Gupta, Prince, et al., "Markerless Tracking and gesture recognition using polar correlation of camera optical flow", Machine Vision and Applications, vol. 24, Issue 3, pp. 651-666, Apr. 2013.

\* cited by examiner

OBJECT TRACKING WITH OPPOSING IMAGE CAPTURE DEVICES

CROSS-REFERENCE TO RELATED APPLICATION

This application is the 35 U.S.C. §371 national stage of, and claims priority to and the benefit of, PCT application PCT/US2010/034706, filed May 13, 2010, which claims priority to and the benefit of U.S. Provisional Application No. 61/315,543, filed on Mar. 19, 2010, herein incorporated by reference in its entirety.

FIELD OF THE DISCLOSURE

The present disclosure relates to computerized tracking of objects, and more specifically, to object tracking using computer-based vision.

BACKGROUND

Vision-based tracking systems for tracking objects in motion can be classified into two genres: inside-looking-out, in which the optical sensor is placed on the moving object and the scene is stationary; and outside-looking-in, in which the optical sensor is stationary and observes the moving object. One conventional approach to vision-based tracking relies on markers in the environment for use as reference points. Another conventional approach relies on a pre-loaded model of the physical environment.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure.

DETAILED DESCRIPTION

Disclosed herein are implementations of an inside-out vision-based tracking system which uses a computing device and an orthogonal configuration of two pairs of opposing image capture devices. An image capture device may take the form, for example, of a digital video camera. In some embodiments, the image capture device is a perspective camera.

The arrangement of image capture devices moves along with the object being tracked. The computing device receives a series of images from each image capture device and calculates successive positions for the object. The arrangement of image capture devices, in conjunction with polar correlation of optical flow, reduces the complexity of computing the object's three-dimensional motion.

Possible applications for the tracking system embodiments disclosed herein include, but are not limited to: a handheld controller for playing games; an input device for human-computer interactions like scrolling, pointing, tracking, etc.; and an input device for interacting with virtual environments. The tracking system embodiments can also be mounted on a mobile platform for use in robotic applications such as tracking, localization, and mapping.

Figure 1:
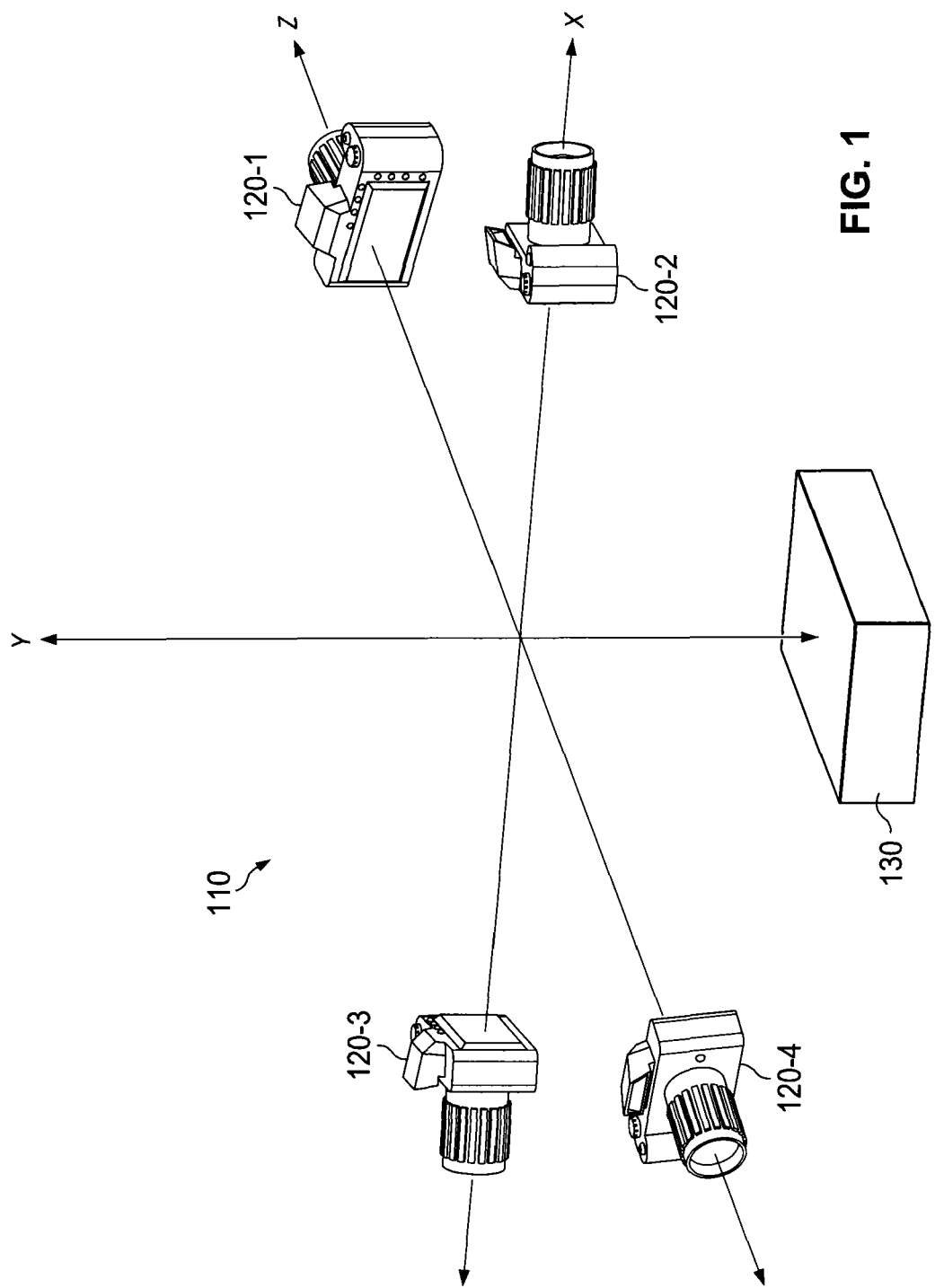
FIG. 1 is a diagram showing the relationship between image capture devices and an object being tracked, according to some embodiments.

FIG. 1 is a diagram showing the relationship between the image capture devices and the object being tracked. The image capture arrangement 110 includes a plurality of image capture devices 120-1, 120-2, 120-3, 120-4. Arrangement 110 travels along with an object 130 being tracked. A computing device (see FIG. 7) receives a series of images from each image capture device 120-1, 120-2, 120-3, 120-4 and processes these images to compute successive positions for the moving object. A new object position is based on a previous position of the object, a translation of the object, and a current orientation of the object. These computations are described in more detail below.

As noted above, the image capture devices 120 are arranged in an orthogonal manner, with two sets of opposing pairs. Although the object being tracked is not shown in FIG. 2, this image capture device is stationary with respect to the object and thus observes the moving object. The image capture device arrangement 110 is therefore said to be "worn by" or "held by" the object being tracked.

Figure 2:
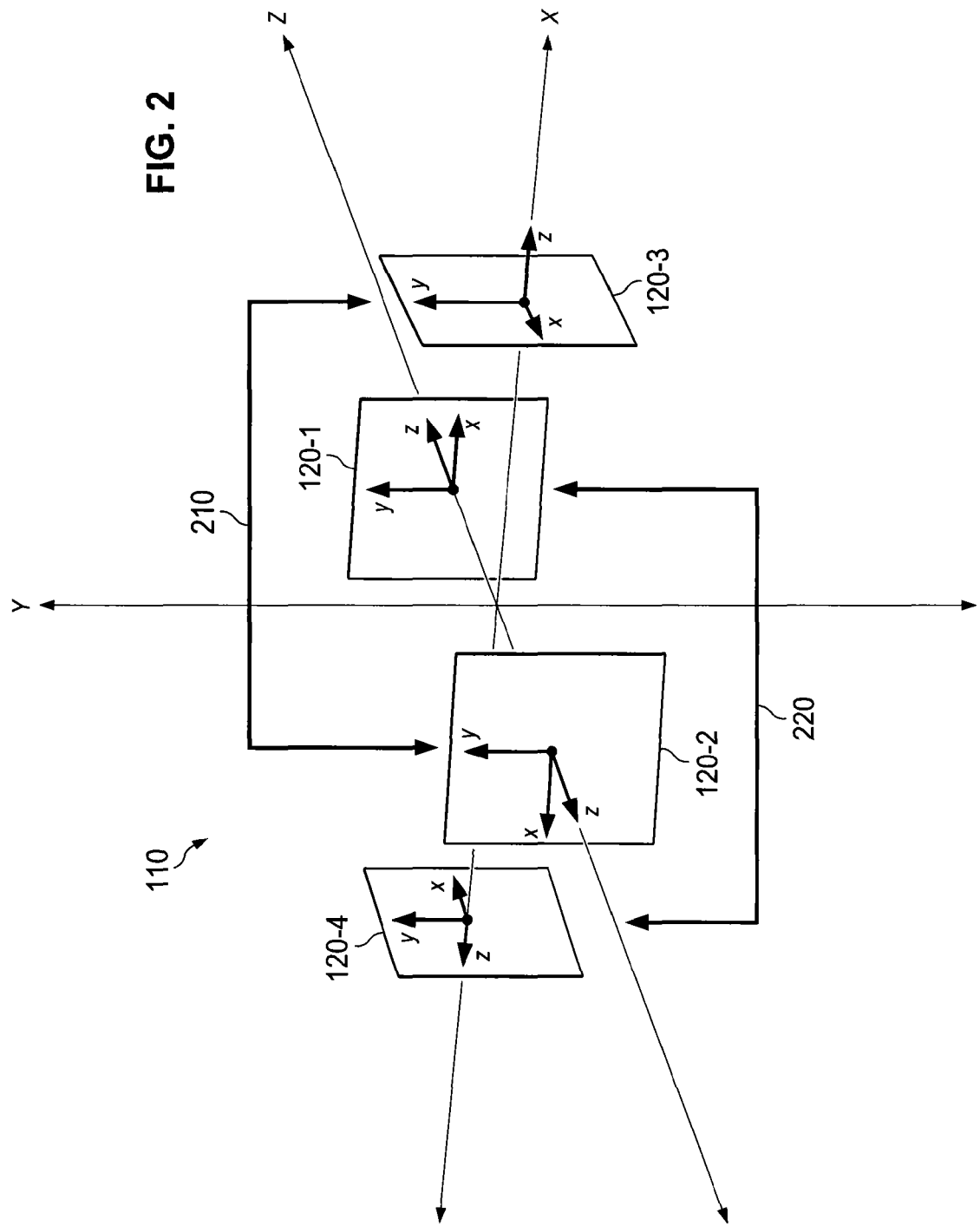
FIG. 2 is a diagram showing an orthogonal configuration of image capture devices, according to some embodiments.

FIG. 2 is a diagram showing the orthogonal configuration of image capture devices in various embodiments of the tracking system disclosed herein. The image capture devices 120 are arranged as a first opposing pair 210 and a second opposing pair 220. The arrangement 110 is orthogonal, such that devices 120 are equidistant from, and at right angles to, each other. The position $s_k$ and orientation $m_k$ of each image capture device 120 with respect to the coordinate system of the arrangement 110 is as follows. For device 120-1, $s_1 = [0, 0, 1]^T$;

$$m_1 = \begin{bmatrix} 1 & 0 & 0 \\ 0 & 1 & 0 \\ 0 & 0 & 1 \end{bmatrix}^T.$$

For device 120-2, $s_2 = [0, 0, -1]^T$;

$$m_2 = \begin{bmatrix} -1 & 0 & 0 \\ 0 & 1 & 0 \\ 0 & 0 & -1 \end{bmatrix}^T.$$

For device 120-3, $s_3 = [1, 0, 0]^T$;

$$m_3 = \begin{bmatrix} 0 & 0 & -1 \\ 0 & 1 & 0 \\ 1 & 0 & 0 \end{bmatrix}^T.$$

For device 120-4, $s_4=[-1, 0, 0]^T$;

$$m_2 = \begin{bmatrix} 0 & 0 & 1 \\ 0 & 1 & 0 \\ -1 & 0 & 0 \end{bmatrix}^T.$$

Devices 120 are held in this fixed arrangement relative to each other by a rig (not shown). In addition to keeping the image capture device arrangement fixed, the rig structure allows the arrangement to be secured to the object (130 in FIG. 1) that is being tracked. As can be appreciated, this rig can be implemented using a wide variety of different mechanisms.

Figure 3:
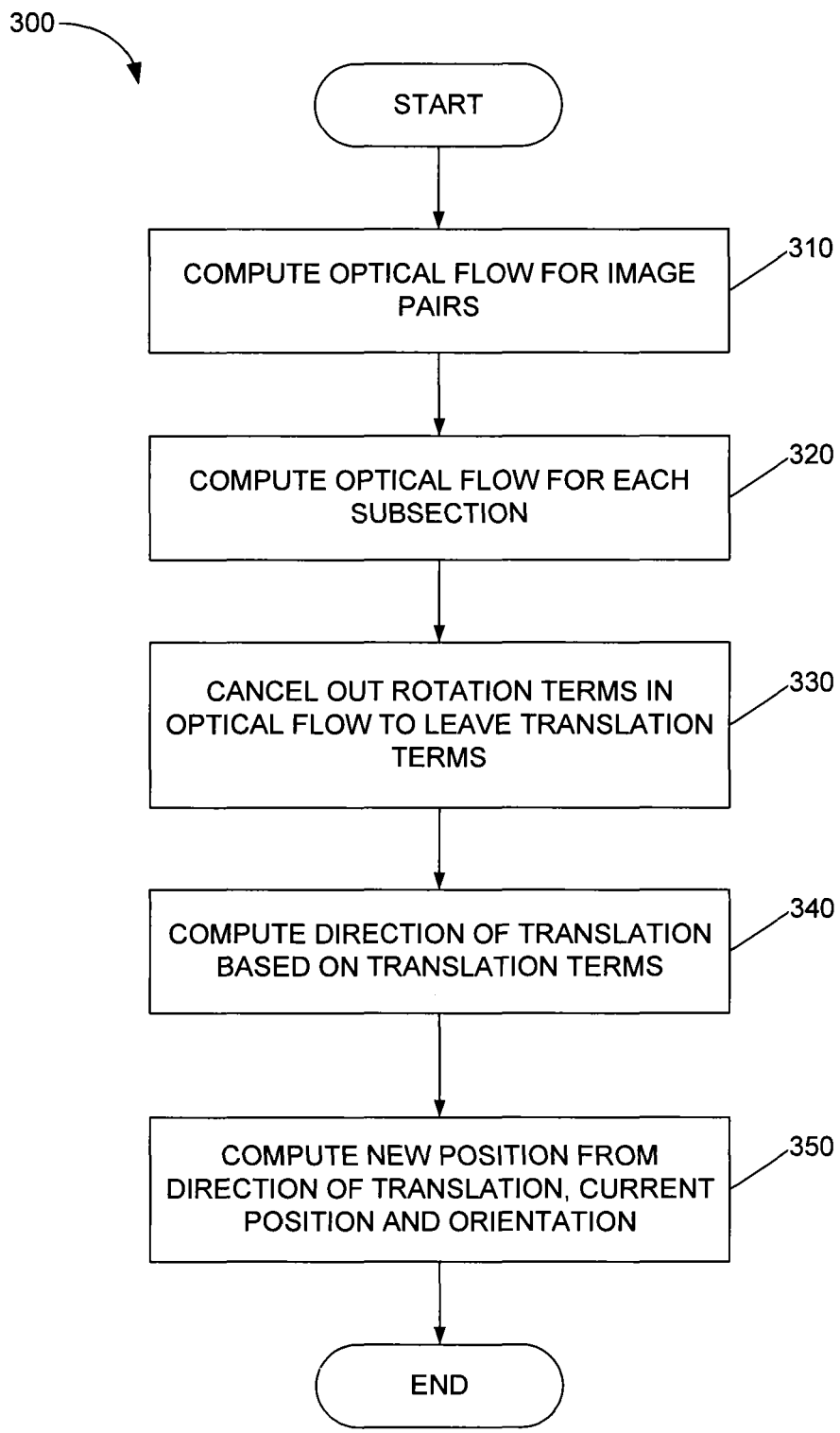
FIG. 3 is a flowchart of a process to compute successive positions for an object being tracked, according to some embodiments.

As noted above, the tracking system computes successive positions for the moving object 130 (FIG. 1) from images provided by the image capture devices. FIG. 3 is a flowchart of a process performed by some embodiments of computing device 710 (FIG. 7) to compute successive positions for the moving object 130. The process 300 begins at block 310, where computing device 710 analyzes a time series of images to compute the optical flow for images from each image capture device 120. Optical flow, also known as image motion, refers to a vector describing the motion of each pixel from one image of a scene to the next image of a scene. In some embodiments, the time series is a pair of images or a pair of successive images. At block 320, computing device 710 divides an image into subsections, and uses the optical flow vectors to compute an average optical flow for each subsection. In some embodiments, the subsections are of equal size. In some embodiments, the subsection is a quadrant. In some embodiments, the average optical flow is computed at symmetric points within the subsections.

Having computed an average optical flow per subsection, per image capture device, processing moves to block 330, where computing device 710 obtain the object's direction of translation in a simplified manner by taking advantage of the orthogonal image capture device configuration. The principle of polar correlation holds that opposing image capture devices have components of optical flow in common: the rotation terms. These common components allow the rotation terms to be cancelled out of the average optical flow, leaving only translation terms. While considering optical flow across all subsections and all image capture devices, block 330 uses polar correlation to cancel out the rotation terms of optical flow, leaving only translation terms. Computing device 710 computes the object's direction of translation from these translation terms.

At block 340, computing device 710 computes the direction of translation of object 130 based on the translation terms of the average optical flow. The direction of translation is not based on rotation terms within the average optical flow (which have been cancelled out in bock 330). Finally, at block 350, computing device 710 computes the object's next position based on the direction of translation (block 340), together with the object's current position and the object's current orientation.

Figure 4:
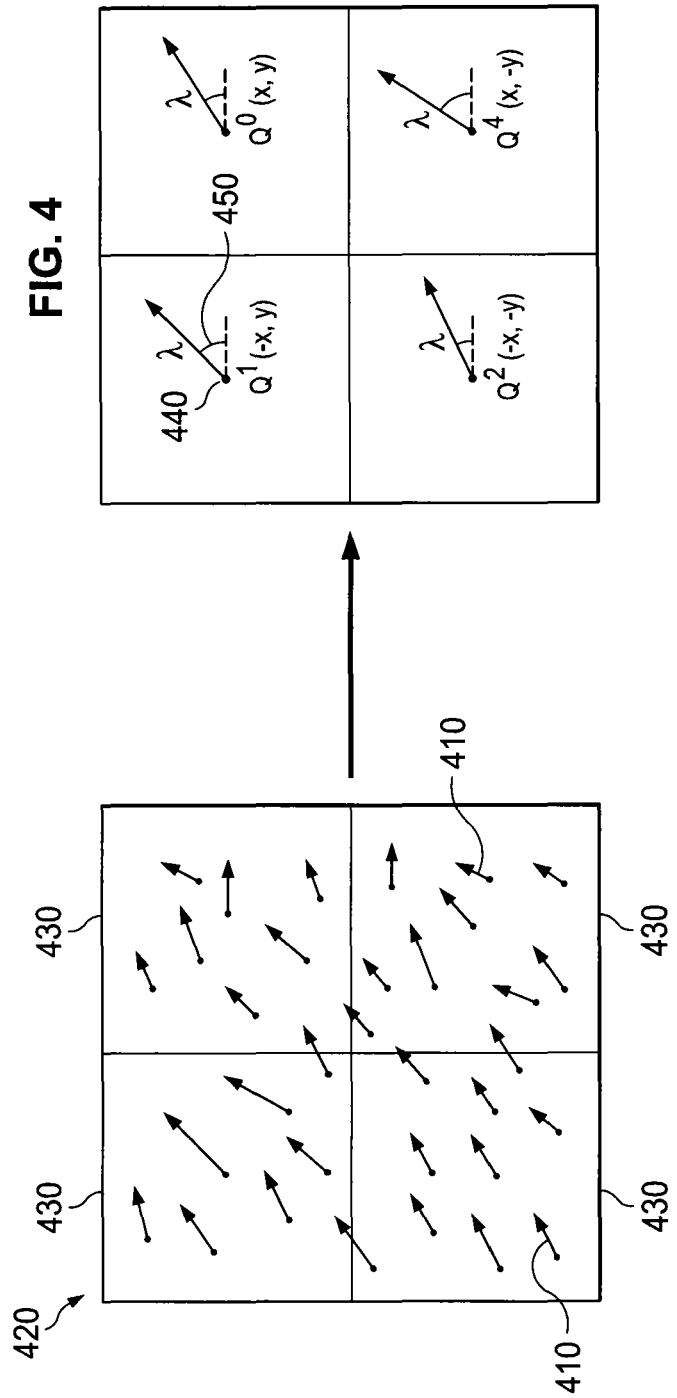
FIG. 4 is a diagram illustrating a process to compute average optical flow vectors, according to some embodiments.

FIG. 4 is a diagram illustrating a process performed by some embodiments of computing device 710 (FIG. 7) to compute average optical flow vectors. Optical flow vectors 410 are computed for image pairs, as described earlier in connection with FIG. 3. The image 420 is divided into quadrants 430. The center point of each quadrant is a quadrantization point $Q^i_k$ 440 (repeated for each corresponding image capture device $C_k$). At each quadrantization point $Q^i_k$, computing device 710 computes the average optical flow vector 450, having some uniform constant magnitude λ and angle θ, as the average of all flow vectors' angles in that quadrant.

Figure 5:
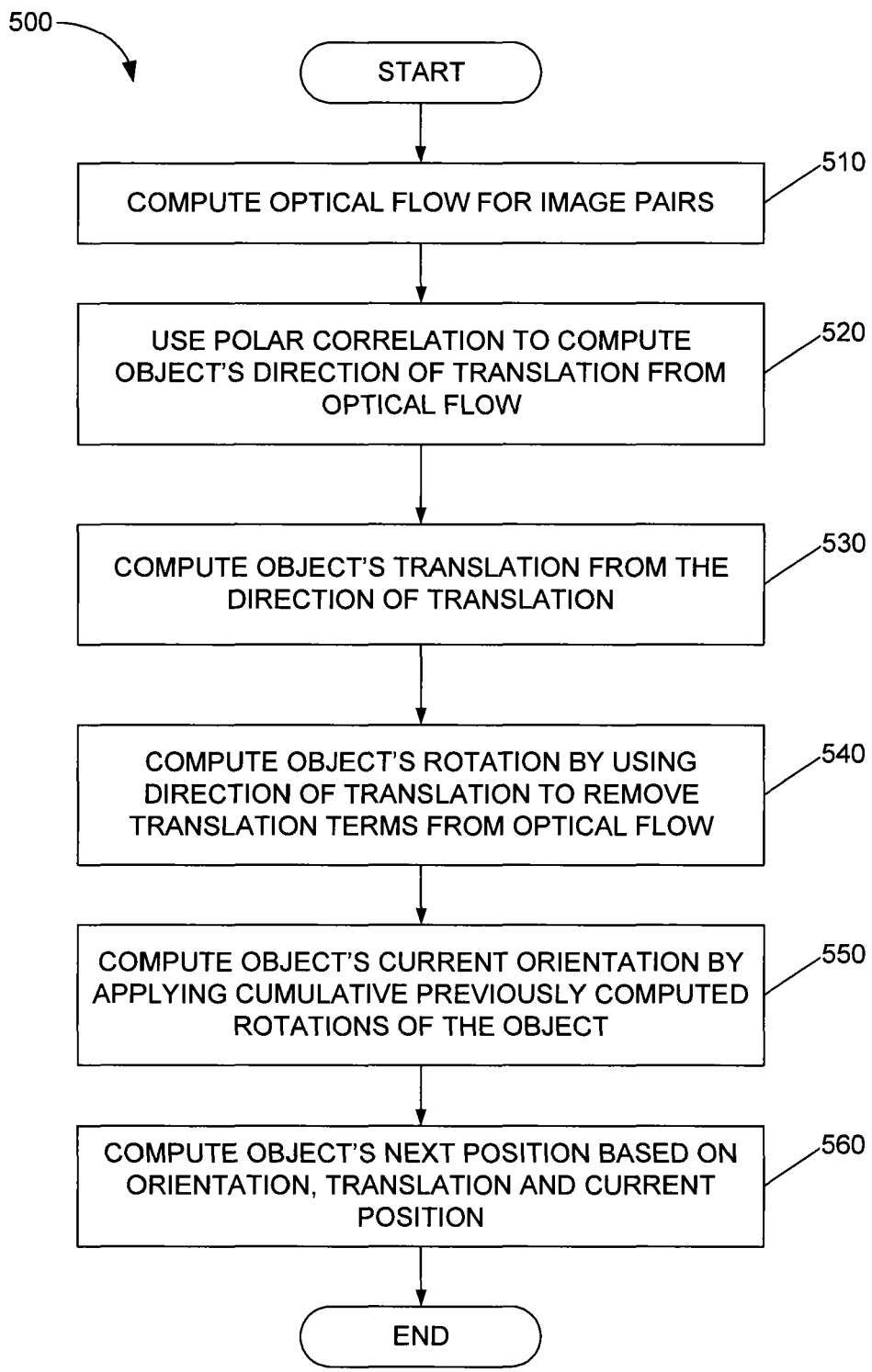
FIG. 5 is a flowchart of a process to compute successive positions for an object being tracked, according to some embodiments.

FIG. 5 is a flowchart of a process performed by some embodiments of computing device 710 (FIG. 7) to compute successive positions for the moving object 130. Where the chart of FIG. 3 focused on the computation of direction of translation of object 130, the flowchart of FIG. 5 shows how the direction of translation computation fits into the overall computation of the next position. The process 500 begins at block 510, where computing device 710 computes optical flow for successive image pairs. At block 520, computing device 710 uses polar correlation to compute the object's direction of translation from the optical flow. (The concept of polar correlation and it use was described in connection with FIG. 3.) At block 530, computing device 710 computes the object's translation vector from the direction of translation. In some embodiments, a constant magnitude of translation is assumed.

At block 540, computing device 710 computes the object's rotation, by using the direction of translation to remove translation terms from optical flow, which leaves the rotation terms. At block 550, computing device 710 computes the object's current orientation, by cumulatively applying previously computed rotations of the object. More specifically, block 550 computes the Euler angles of rotation by normalizing the angular velocity and then multiplying it with a constant magnitude. (Computation of angular velocity is discussed later in connection with FIG. 6). A rotation matrix R for every time frame is then computed from these Euler angles. Finally, at block 560, computing device 710 computes the object's next position based on the orientation (550), the translation (530) and the current position.

Figure 6:
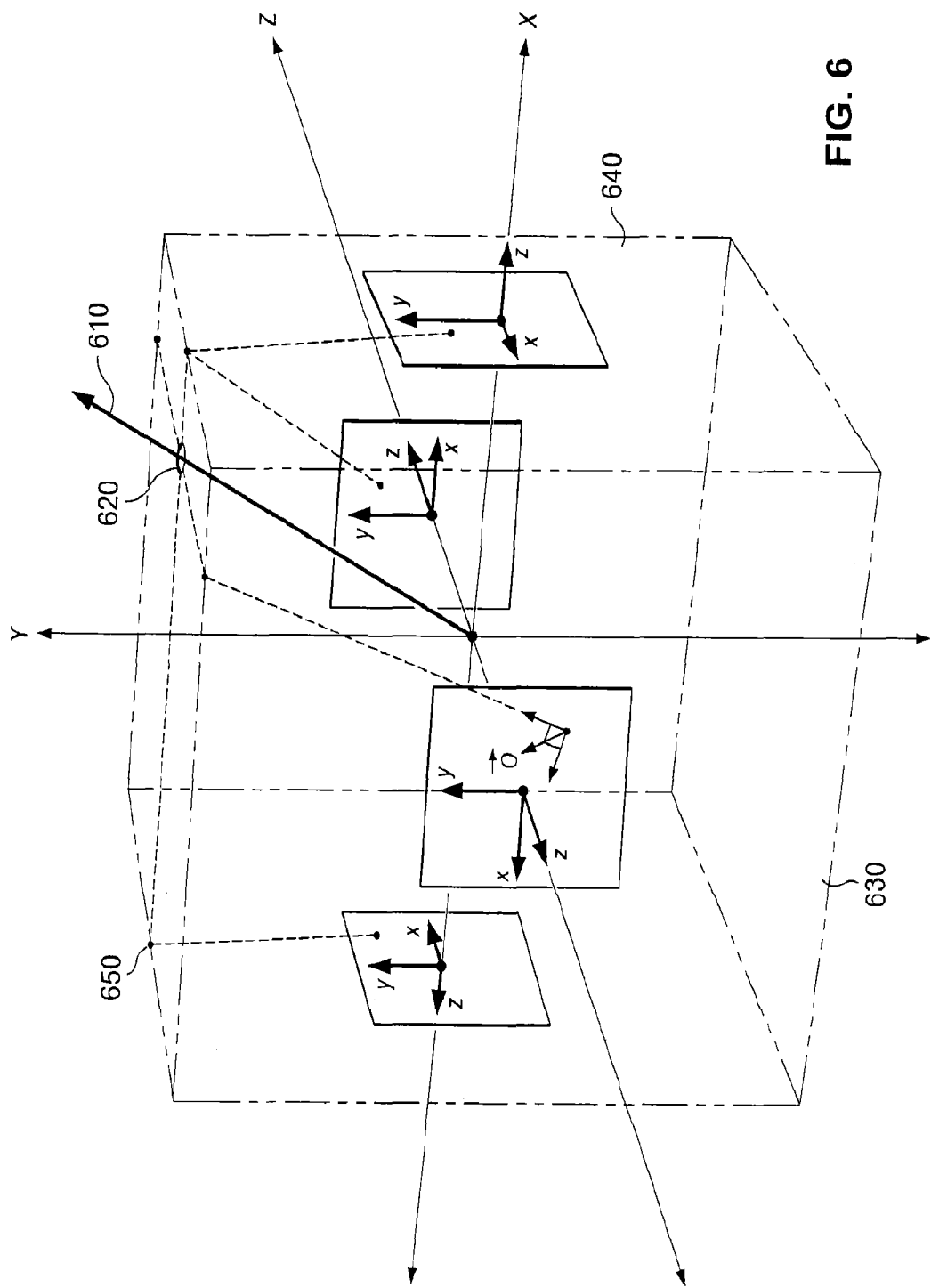
FIG. 6 is a diagram illustrating a process to compute angular velocity, according to some embodiments.

FIG. 6 is a diagram illustrating a process performed by some embodiments of computing device 710 (FIG. 7) to compute angular velocity. In this process, the object's direction of translation (block 520) is used to compute the focus of expansion, and angular velocity is then computed from the focus of expansion. More specifically, as can be seen in FIG. 6, the direction of translation 610 intersects a sphere surrounding an image capture device 120 at a point known as the focus of expansion 620. To reduce computation complexity, this sphere is approximated with a cube 630 at the object's origin, with four of its faces lining up with the image planes 640 of the corresponding image capture devices 120. Computing device 710 computes the focus of expansion point 620 as the intersection of direction of translation 610 and cube 630. Computing device 710 projects focus of expansion point 620 onto the side faces of cube 630, thus providing a local focus of expansion 650 for each image capture device 120.

The angular velocity of image capture device arrangement 110 is computed from local focus of expansion 650 as follows. The translational component of optical flow at point P always lies on the line connecting the (local) focus of expansion 650 and the point P. Therefore the component of optical flow perpendicular to the line connecting focus of expansion 650 and the point P has a projection which includes only the rotational component of optical flow.

Computing device 710 uses this projected component of optical flow to produce a linear equation in three unknowns, which correspond to the three rotation terms. This linear equation is produced for each point with optical flow. Computing device 710 combines these equations into a family of linear system equations. Computing device 710 then uses back-substitution to solve the system, thus producing the angular velocity. For cameras shifted from the rig center optical flow also has a component of translation due to the rotation of rig, but when the rotation is small, this rotational component makes a small contribution and therefore can be ignored.

Having described various aspects of the tracking system and various aspects of the operation of computing device 710, further details of the computations involved will now be provided. As noted above, polar correlation can be used to cancel out common components of optical flow. Before further describing polar correlation, the concept of optical flow will be further explained. Given two successive images of a scene, the motion of each pixel in the first image to the second image is defined as a vector $[u, v]^T$ called optical flow, where u and v are velocity components in the x and y direction respectively.

Using the instantaneous model of optical flow, for an image capture device $C_k$, the optical flow vector $[u, v]^T$ at point P(x, y) can be written as:

$$u^k = \frac{-t_x^k + xt_z^k}{Z} + \omega_x^k xy - \omega_y^k(x^2 + 1) + \omega_z^k y, \quad (1)$$

$$v^k = \frac{-t_y^k + yt_z^k}{Z} + \omega_x^k(y^2 + 1) - \omega_y^k xy - \omega_z^k x. \quad (2)$$

where $t^k = [t_x^k, t_y^k, t_z^k]^T$ is the translation and $\omega^k = [\omega_x^k, \omega_y^k, \omega_z^k]^T$ is the angular velocity of image capture device $C_k$ and Z is the z component (i.e., depth) of the three-dimensional point corresponding to the image point P(x, y).

For an image capture device shifted from the origin:

$$t^k = m_k[(\omega \times s_k) + T], \omega^k = m_k \omega, \quad (3)$$

where $t^k$ is the translation, $\omega^k$ is the angular velocity of image capture device $C^k$ placed at position $s_k$ with orientation $m_k$, and $T = [T_x, T_y, T_z]^T$ is the translation and $\omega = [\omega_x, \omega_y, \omega_z]^T$ is the angular velocity of the rig.

Substituting values of position and orientation for a particular image capture device (e.g., image capture device 1) into equation (3), we get:

$$t^1 = \begin{bmatrix} \omega_y + T_x \\ -\omega_x + T_y \\ T_z \end{bmatrix}, \omega^1 = \begin{bmatrix} \omega_x \\ \omega_y \\ \omega_z \end{bmatrix}. \quad (4)$$

Substituting equation (4) in equations (1) and (2), we get:

$$u^1 = \frac{-\omega_y - T_x + xT_z}{Z} + \omega_x xy - \omega_y(x^2 + 1) + \omega_z y, \quad (5)$$

$$v^1 = \frac{\omega_x - T_y + yT_z}{Z} + \omega_x(x^2 + 1) - \omega_y xy - \omega_z x. \quad (6)$$

Equations (5) and (6) represent the optical flow in image capture device 1 in terms of the rig motion parameters T and $\omega$. Similarly equations for image capture device 2, 3, and 4 can also be obtained.

Having described optical flow, the use of polar correlation to cancel out common components of optical flow will now be further explained. Consider four symmetric points of the form $Q^0(x, y)$, $Q^1(-x, y)$, $Q^2(-x, -y)$ and $Q^3(x, -y)$. Let the optical flow vector at these symmetric points for image capture device $C_k$ be $[u^k_{Qi}, v^k_{Qi}]^T$ (for i=0 to 3). The equations for flow vectors at these symmetric points in image capture device 1 can be obtained by substituting the coordinates of these points in terms of x and y in equations (5) and (6) for image capture device 1. The equations for optical flow at point $Q^0$ in image capture device 1 are:

$$u^1_{Q_0} = \frac{-\omega_y - T_x + xT_z}{Z} + \omega_x xy - \omega_y(x^2 + 1) + \omega_z y, \quad (7)$$

$$v^1_{Q_0} = \frac{\omega_x - T_y + xT_z}{Z} + \omega_x(x^2 + 1) - \omega_y y - \omega_z x. \quad (8)$$

Similarly equations for all the four image capture devices at these four symmetric points $Q^0$ to $Q^3$ can be obtained. Next, we compute a quantity $[L^k_x, L^k_y]$ for image capture device $C_k$ as:

$$L^k_x = \frac{\sum_{i=0}^{3} u^k_{Qi}}{4}, L^k_y = \frac{\sum_{i=0}^{3} v^k_{Qi}}{4}. \quad (9)$$

Next a quantity $[G_x, G_y, G_z]$ is computed as:

$$G_x = \frac{-L^1_x + L^2_x}{2}, G_y = \frac{-L^1_y - L^2_y - L^3_y - L^4_y}{4}, G_z = \frac{L^3_x - L^4_x}{2}. \quad (10)$$

By substituting equation (9) for all the four image capture devices in equation (10) we get:

$$G_x = T_x/Z, G_y = T_y/Z, G_z = T_z/Z. \quad (11)$$

$[G_x, G_y, G_z]$ is the scaled version of translation $T = [T_x, T_y, T_z]^T$ of the rig. The computation of $[G_x, G_y, G_z]$ cancels all the rotation terms and we are left with only translation terms. This technique uses the concept of polar correlation, which holds that opposing image capture devices have common components of optical flow, which can be canceled out as shown above to obtain the direction of translation of the rig.

After computing optical flow in each image capture device, flow vectors from each frame are passed through a quadrantization step to get an estimate of optical flow at symmetric points $Q^0(x, y)$, $Q^1(-x, y)$, $Q^2(-x, -y)$ and $Q^3(x, -y)$ in preparation for polar correlation. Each frame is divided into four quadrants. The center points of each quadrant are called quadrantization points $Q^i_k$ (for i=0 to 3) for image capture device $C_k$. Each quadrantization point is associated with a vector with some uniform constant magnitude $\lambda$ and angle as the average of all flow vectors' angles in that quadrant.

The angular velocity can be computed as follows. After computing the scaled version of translation of the rig, the translation $t_k$ of each image capture device $C_k$ is obtained using $$t_k = m_k T, \quad (12)$$

where $m_k$ is the orientation of image capture device $C_k$ and T is the translation of the rig. Using the translation of each image capture device, a synthetic translational field $[u^k_t, v^k_t]$ is generated for each image capture device, as $$u^k_t = \frac{-t_x^k + xt_z^k}{Z}, v^k_t = \frac{-t_y^k + yt_z^k}{Z}. \quad (13)$$

A synthetic translational flow vector is generated for all points where the optical flow has been computed. The translational component of optical flow at point P will lie on the line that joins the point P to the focus of expansion (FOE). Therefore, using the synthetic translational flow at each point provides the direction of the line joining the point P and the FOE. When a image capture device $C_k$ is shifted from the rig center, an optical flow vector in that image capture device has three components, vec(o)=vec($o_t$)+vec($o_{tr}$)+vec($o_r$), where vec($o_t$) is a translational component due to translation of the rig, vec($o_{tr}$) is a translational component due to rotation of the rig, [($\omega \times s_k$) term in equation (3)], and vec($o_r$) is a rotational component due to rotation of the rig. The component of optical flow perpendicular to the line connecting the FOE and the point P includes a projection of the translational component vec($o_{tr}$) due to the rotation of the rig, and a projection of the rotational component vec($o_r$) due to rotation of rig. (See FIG. 6.) Let vec(F) be the vector going from the FOE ($x_0, y_0$) to a point P(x, y) on the image plane. Then, $$\vec{F} = (x - x_0)\hat{i} + (y - y_0)\hat{j}. \quad (14)$$

Let vec($F_p$) be a vector perpendicular to vec(F), obtained by 90° rotation. Then, $$\vec{F}_p = (y_0 - y)\hat{i} + (x - x_0)\hat{j}. \quad (15)$$

Normalizing the vector vec($F_p$) produces $$\vec{F}_{pn} = \frac{(y_0 - y)}{\sqrt{(y_0 - y)^2 + (x - x_0)^2}}\hat{i} + \frac{(x - x_0)}{\sqrt{(y_0 - y)^2 + (x - x_0)^2}}\hat{j}. \quad (16)$$

As noted above, the translational component of the optical flow will lie on the line connecting the image point and the FOE. Therefore, vec($o_t$) will always lie on the line joining point P and the FOE. Now the component of (vec($o_r$)+vec($o_{tr}$)) perpendicular to vec(F) is obtained, by taking a dot product between (vec($o_r$)+vec($o_{tr}$)) and vec($F_{pn}$). The motive behind normalizing vec($F_p$) is that the component of (vec($o_r$)+vec($o_{tr}$)) perpendicular to vec(F) can be found directly by computing a dot product between (vec($o_r$)+vec($o_{tr}$)) and vec($F_{pn}$). Using the computed optical flow over the image frames from the four image capture devices, on selected interest points, the following numerical value is obtained $$\eta = (\vec{o}_r + \vec{o}_{tr}) \cdot \vec{F}_{pn}, \quad (17)$$

by taking the projection of the flow vector perpendicular to the line connecting the point to the FOE. Extracting the rotational component and translational component due to the rotation of the rig (from equations (5) and (6) for Image capture device 1) produces $$\vec{o}_r = [\omega_x xy - \omega_y(x^2 + 1) + \omega_z y]\hat{i} + [\omega_x(y^2 + 1) - \omega_y xy - \omega_z x]\hat{j}, \quad (18)$$

$$\vec{o}_{tr} = \frac{-\omega_y}{Z}\hat{i} + \frac{\omega_y}{Z}\hat{j}. \quad (19)$$

Substituting equations (16), (18) and (19) in equation (17) results in an equation of the form:

$$\omega_x c_1 + \omega_y c_2 + \omega_z c_3 = \eta, \quad (20)$$

where $c_1$, $c_2$ and $c_3$ are in terms of $x_0$, $y_0$, x, y and Z. Similar methods produce equations for image capture devices 2, 3 and 4. Thus each point in an image capture device results in one equation in three unknowns $\omega_x$, $\omega_y$, and $\omega_z$. Choosing a uniform constant value for depth Z and using all the points in all the four image capture devices, a family of equations is obtained having the form:

$$PX = Q, \quad (21)$$

where $X = [\omega_x, \omega_y, \omega_z]^T$, P is a N×3 matrix and Q is a N×1 vector of known quantities, for a total of N interest points. Pre-multiplying both sides of equation (21) by $P^T$ results in $$P^T P X = P^T Q. \quad (22)$$

Since $P^T P$ is a 3×3 matrix and $P^T Q$ is a 3×1 vector, the result is linear equations in three unknowns. Solving this system of equations produces $\omega_x$, $\omega_y$, and $\omega_z$, the angular velocity of the rig.

Figure 7:
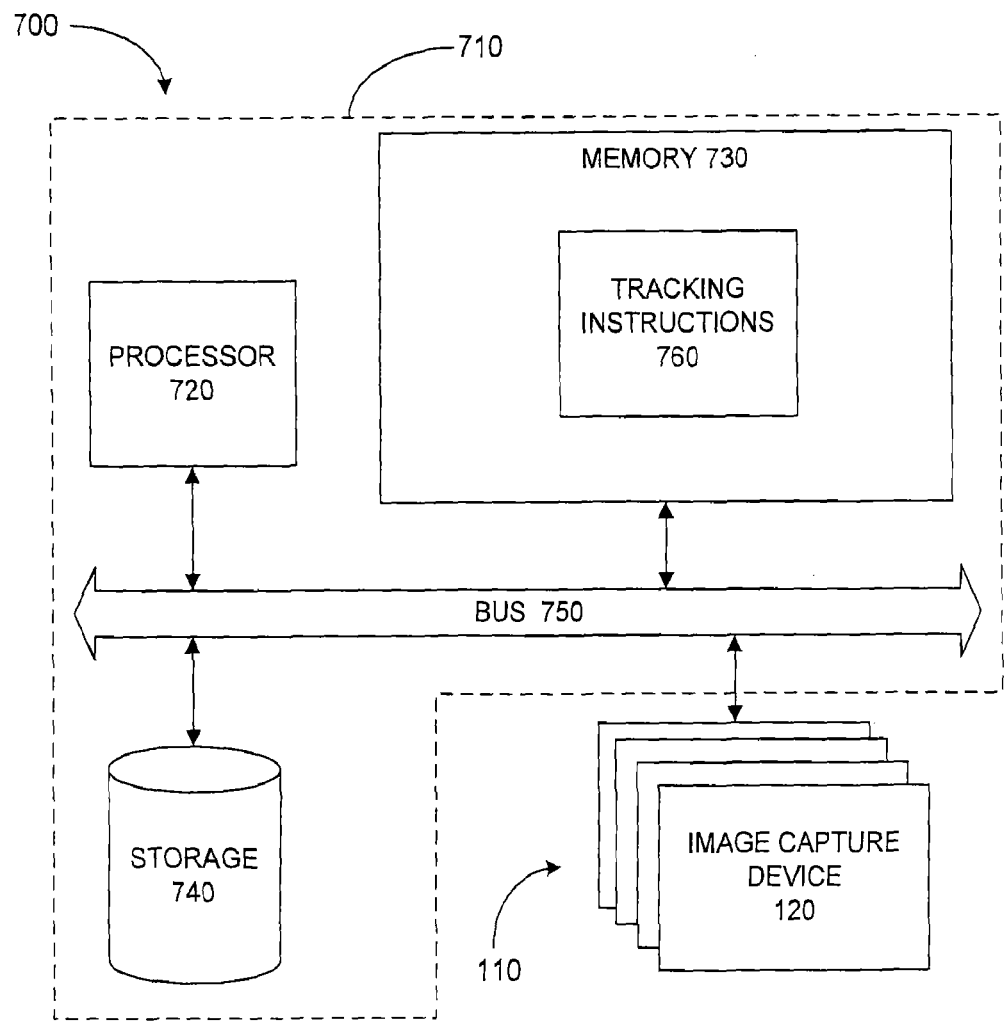
FIG. 7 is a hardware block diagram of a tracking system, according to some embodiments.

FIG. 7 is a hardware block diagram of an embodiment of the tracking system described above. Tracking system 700 includes a computing device 710 communicatively coupled to an image capture device arrangement 110. Computing device 710 includes a processor 720 (e.g., microprocessor, digital signal processor, microcontroller, digital signal controller), memory 730, and storage device 740. These components are coupled via a bus 750. Omitted from FIG. 7 are a number of conventional components that are unnecessary to explain the operation of tracking system.

Computing device 710 communicates with image capture device arrangement 110 to receive a series of images or scenes. Embodiments of tracking system process the received images as explained above in order to track motion of the object through 3D space. In some implementations, computing device 710 communicates with each image capture device 120 individually. In other implementations, computing device 710 communicates with a particular one of the devices 120, and that device 120 communicates with the others. In still other implementations, computing device 710 communicates with a central unit separate from the devices 120, and that unit communicates with all the devices 120.

In the embodiment of FIG. 7, tracking instructions 760 reside in memory 730 as instructions which, when executed by processor 720, implement the computations and processes described in connection with FIGS. 3-6. In other embodiments (not shown), these functions and processes are implemented in specialized hardware logic, including, but not limited to, a programmable logic device (PLD), a programmable gate array (PGA), a field programmable gate array (FPGA), an application-specific integrated circuit (ASIC), a system on chip (SoC), and a system in package (SiP). Such digital logic implementations are not limited to pure digital but may also include analog sections or components.

Tracking instructions 760 can be embodied in any computer-readable medium for use by or in connection with a processor. In the context of this disclosure, a "computer-readable medium" can be any means that can contain or store the instructions for use by the processor. The computer readable medium can be, for example but not limited to, a system or that is based on electronic, magnetic, optical, electromagnetic, or semiconductor technology.

Specific examples of a computer-readable medium using electronic technology would include (but are not limited to) the following: random access memory (RAM); read-only memory (ROM); and erasable programmable read-only memory (EPROM or Flash memory). A specific example using magnetic technology includes (but is not limited to) a portable computer diskette. Specific examples using optical technology include (but are not limited to) compact disk (CD) and digital video disk (DVD).

The foregoing description has been presented for purposes of illustration and description. It is not intended to be exhaustive or to limit the disclosure to the precise forms disclosed. Obvious modifications or variations are possible in light of the above teachings. The implementations discussed, however, were chosen and described to illustrate the principles of the disclosure and its practical application to thereby enable one of ordinary skill in the art to utilize the disclosure in various implementations and with various modifications as are suited to the particular use contemplated. All such modifications and variation are within the scope of the disclosure as determined by the appended claims when interpreted in accordance with the breadth to which they are fairly and legally entitled.

What is claimed is:

1. A method of tracking motion of an object, the method comprising:
   receiving a series of images captured by each of a plurality of image capture devices, the image capture devices arranged in an orthogonal configuration of two opposing pairs; and
   computing a series of positions of the object by processing the images captured by each of the plurality of image capture devices.

2. The method of claim 1, wherein the computing comprises:
   computing each of the series of positions of the object based on a previous position of the object, a translation of the object, and a current orientation of the object.

3. The method of claim 1, wherein the computing comprises:
   computing an optical flow for a pair of successive images captured by one of the image capture devices;
   computing an average optical flow for each of a plurality of subsections of the image pair;
   computing a translation of the object based on the average optical flow; and
   computing each of the series of positions of the object based on the translation of the object, a previous position of the object, and a current orientation of the object.

4. The method of claim 3, wherein the subsection is a quadrant.

5. The method of claim 3, wherein the average optical flow is obtained at symmetric points within the subsections.

6. The method of claim 3, further comprising repeating the computation of the optical flow, the average optical flow, and the translation, using images provided by each of the image capture devices.

7. The method of claim 1, wherein the computing comprises:
   for each of the image capture devices, computing an optical flow for a pair of successive images captured by a corresponding one of the image capture devices;
   for each of the optical flows, obtaining an average optical flow for each of a plurality of subsections of the image pair;
   canceling out common components in the average optical flow across all of the subsections and all of the image capture devices, the common components being those from opposing image capture devices; and
   computing a translation of the object based on translation terms, but not rotation terms, in the average optical flow.

8. The method of claim 7, wherein the average optical flow is obtained at symmetric points within the subsections.

9. The method of claim 7, wherein the subsection is a quadrant.

10. The method of claim 1, wherein the computing comprises:
    computing a direction of translation of the object by using polar correlation to cancel out rotation terms leaving only translation terms; and
    calculating the next position in the series based on the computed direction of translation and on the previous position in the series.

11. A system for tracking motion of an object, the system comprising:
    an orthogonal configuration of two pairs of opposing image capture devices, the orthogonal configuration adapted for mounting on the object; and
    a tracking module configured to receive a series of images from each of the image capture devices and to compute a series of positions of the object by processing the images.

12. The system of claim 11, wherein the image capture devices are perspective image capture devices.

13. The system of claim 11, the tracking module further configured to:
    compute the object's direction of translation by using polar correlation to cancel out rotation terms leaving only translation terms; and
    calculate a next position in the series of positions based on the computed direction of translation and on a previous position in the series of positions.

14. The system of claim 11, the tracking module further configured to:
    compute optical flow in each image capture device;
    obtain the object's rotation by isolating the translation component from the optical flow, using a computed direction of translation;
    obtain translation of the object from the computed direction of translation and the current orientation of the object from a cumulative previous calculated rotations of the object; and
    compute a next position in the series of positions based on the object's translation, the object's current orientation, and a previous position in the series of positions.

15. A system for tracking motion of an object, the system comprising:
    a tracking module configured to:
      receive a series of images from each of a plurality of image capture devices;
      compute optical flow from the series of images;
      compute a translation of the object and a current orientation of the object, the translation and the current orientation based at least on the optical flow; and
      compute an updated position of the object based on a previous position of the object, the translation of the object, and the current orientation of the object,
    wherein the plurality of image capture devices are arranged in an orthogonal configuration of two pairs of opposing image capture devices, wherein the orthogonal configuration is adapted for mounting on the object.

16. The system of claim 15, the tracking module further configured to:
    compute the object's direction of translation by using polar correlation to cancel out rotation terms leaving only translation terms; and
    calculate a next position in the series of positions based on the computed direction of translation and on the previous position in the series of positions.

17. The system of claim 15, the tracking module further configured to:
    compute optical flow in each of the image capture devices;
    obtain the object's rotation by isolating the translation component from the optical flow, using a computed direction of translation;

obtain translation of the object from the computed direction of translation and the current orientation of the object from a cumulative previous calculated rotations of the object; and compute a next position in the series of positions based on the object's translation, the object's current orientation, and a previous position in the series of positions.

18. The system of claim 15, the tracking module further configured to:

compute an optical flow for a pair of successive images captured by one of the image capture devices;

compute an average optical flow for each of a plurality of subsections of the image pair;

compute a translation of the object based on the average optical flow; and compute each of the series of positions of the object based on the translation of the object, a previous position of the object, and a current orientation of the object.

19. The system of claim 18, wherein the subsection is a quadrant.

20. The system of claim 15, wherein the average optical flow is obtained at symmetric points within the subsections.

\* \* \* \* \*